March 10, 1942. T. VOUVALIDIS 2,276,005
PANCAKE GRIDDLE
Filed Dec. 7, 1940
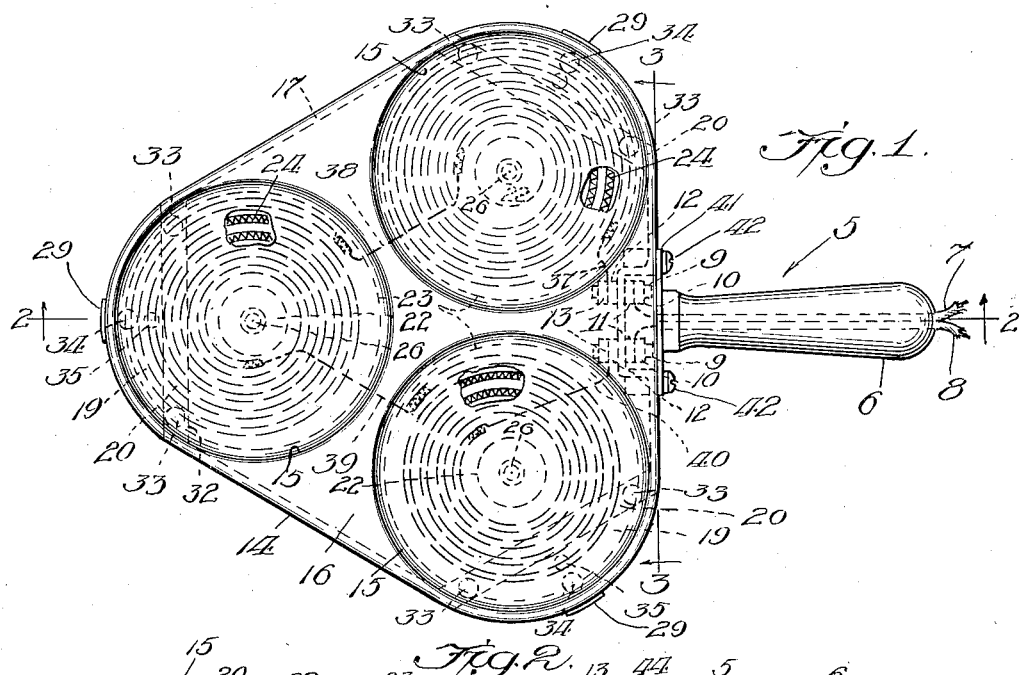
Inventor:
Theofanis Vouvalidis,
by David Mauly Heller
Atty.

Patented Mar. 10, 1942

2,276,005

UNITED STATES PATENT OFFICE 2,276,005

PANCAKE GRIDDLE

Theofanis Vouvalidis, Chicago, Ill.

Application December 7, 1940, Serial No. 369,050

2 Claims. (Cl. 219—19)

This invention relates to electrically heated pancake griddles. A principal object of my invention is to provide a small compact unit which is portable, and which is in the same category or class of cooking or baking utensils, which can be conveniently operated on the dining table during the course of a meal, and is in the class of articles with table toasters, coffee urns, and such other similar devices for instantaneous use and preparation of food immediately prior to their consumption at the table.

Another object of my invention is to provide such a device which may be placed on table tops or other similar articles of furniture having highly polished surfaces, without marring the said finished surfaces, and a device that is primarily insulated with respect to the transmission of heat to such finished table tops or surfaces, on which it may be placed or supported while in operation.

A feature of my invention is to provide a unique leg support which serves the function of supporting the body of my invention, and also serves the purpose of holding the bottom cover plate in place with a single and simple fastening means, and also provided with relieved means to prevent heat from being conducted thru the said leg support.

Another object of my invention is to make a small, compact, portable, practical, and efficient unit which is strong and durable for the purpose intended, and which is of such simple construction as to warrant economical manufacture in quantity production.

Other features and objects of my invention will become apparent by cross-reference to the drawing and the ensuing description wherein like numerals represent like parts and in which:

Fig. 1 is a top view of my invention;

Fig. 2 is a longitudinal cross-sectional view on the line 2—2 of Figure 1;

Fig. 3 is an enlarged cross-sectional view on the line 3—3 of Figure 1; and

Fig. 4 is a side view of the attaching means utilized for simultaneously securing to the body of my invention, the leg and bottom cover plate firmly in place.

Referring to the respective views, Figure 1 shows my invention generally designated by the numeral 5, which is comprised of a handle member 6 secured to an angle plate construction 41, and which is secured in turn to the main body casting 14 of my device by virtue of the screws 42; provision being made in the casting 14 by tapping threaded holes to receive the screws 42 heretofore mentioned.

The casting 14 is generally of a triangular shape as indicated or preferably made so, and is provided with three or more cavities 15, shaped as indicated in the views Figure 1, and Figure 2, for the purpose of receiving pancake batter and heating the said cavities to the point of converting the batter into pancakes.

The cavities as will be noted are slightly countersunk around the edges which serves the purpose of retaining the batter and preventing its overflow, and by virtue of heat being transmitted thru the edges of the cavities 15, causes the batter to run inwardly rather than outwardly, the heat contracting the batter so that the device is always clean and neat while in operation at the table where such pancakes may be made.

Care of course must be exercised in not pouring more batter into the cavity than is actually necessary. As for the remaining elements of construction, the casting 14 is further provided with a pocket portion designated 42 for the purposes presently to be elucidated.

The web 44 is drilled to suit and provide clearance holes for the studs 9, which are held securely in place by virtue of nuts 11 and 12. The nuts 13 and 10 being used as lock nuts and binding posts at the same time for receiving the terminals of the wires 7 and 8 shown broken at the outer end of the handle member 6 and which are connected to an electrical plug usually serving the purpose of connecting the same to a wall receptacle or any other source of electrical supply.

The electrical wires are thus connected to the binding post furnished or created by virtue of the nuts 10 heretofore mentioned, and the nuts 13 on the opposing side serving as lock nuts and binding posts simultaneously for the nichrome wire terminals 37 and 40.

The wire terminals 37 being the anode of one of the porcelain heating units 23, each being provided with a number of coils sufficient to furnish the necessary heat for pancake baking.

The terminal of the coil of wire from one electrical unit may be connected as at 38 to one of the terminals of another electrical unit, and again as at 39, the heating units 23 being connected in series, then ultimately connected to the binding post 13. One binding post nut 13 securing the anode 37, the other securing the cathode 40, thus the circuit is completed. The nichrome wire used being of a fine gauge and high electrical resistance will furnish the necessary heating required at the surface 16 and the cavities 15, thus providing the necessary heat for baking pancakes.

The units 23 may be of porcelain or other similar heating units, may be made up as indicated, of circular discs 23, having recesses 24 in which a series of nichrome wire coils are located, having a bored portion to fit over the hub 22 of the frame casting 14, and are held in place by a screw 26 and a washer element 25.

The casting 14 is provided with a flange 17, and additional flanges 19 at each apex of the triangle, such flanges being provided with a step or ledge 20 in order to receive the bottom cover plate 21 which is shaped to fit the contour and configuration of the casting 14, and also shaped to fit the marginal abutting edge of the ledges 20, thus making a secure and compactly closed heating chamber 18.

The open areas within being packed with mineral wool, asbestos, or other similar insulation as indicated at 27, packing the entire space remaining in the chamber 18.

The device is supported preferably on three legs one at each apex of the triangular casting, and at the point where the flanges 19 are formed. The particular construction of the leg is indicated at Figure 4, showing a flange top which is rather wide and narrows down towards the bottom portion, the arcuate portions 31 are used for symmetry of design.

The buttons indicated at 29 made of dielectric material and having slots 30, are securely fastened to the bottom edge of each leg. This provides further heat insulation and makes the device mar-proof so that it will not damage a polished surface or a highly finished surface of an article of furniture on which it may be positioned while the baking operation is in progress.

I wish to stress particularly, the three point locating method that I have provided for securing the legs 28 to the frame 14 by virtue of providing on their flange portions 32 three semicircular projections, two designated 33, and one designated 34. The projection 34 providing a suitable anchoring button, and the portions 33 being super-imposed upon the edge of the cover plate 21 thus serves to retain the leg and plate in assembly by virtue of the screw 35. The leg is thus secured to the body, and clamps the cover plate 21 securely and firmly in place, so that if it should be necessary to make any repairs, by removing the three screws 35, the legs and the assembled cover plate simultaneously may be removed which makes available the entire structure or mechanism of the pancake baking device, placing same at the disposal of a mechanic for repairs or other work which may be necessary. By virtue of the structure used to secure the legs 28, the gap 36 permits ample air current circulation preventing the conduction of heat from the body to the legs.

The device is connected to an electrical socket or any source of electrical supply, batter poured into the cavities 15, and then the pancakes are baked on one side and when finished turned over and baked on the other side.

I believe I have described succinctly the construction of my invention, its operation, and its utility, and inasmuch as it is susceptible of many modifications, alterations, and improvements, I reserve the right to all such modifications, alterations, and improvements that come within the scope of the accompanying drawing, the above description and the appended claims.

Having thus described and revealed my invention what I claim as new and desire to secure by Letters Patent is:

1. An article of the character described comprising, electrically heated griddle means provided with a multiplicity of baking cavities arranged in triangular formation, leg support means secured to the said griddle means, the said leg means provided with contact means tangentially contacting the said griddle means, hollow handle means secured to the said griddle means, and electrical connection means connecting the said griddle means thru the said hollow handle means to a source of electric current supply.

2. An article of the character described comprising, triangularly shaped hollow griddle means provided with baking cavities arranged in triangular formation, three electrical heating members connected in series secured within the hollow portion of said griddle means and positioned concentrically with respect to said baking cavities, a web portion located near one of the sides of said griddle means, binding post means secured to said web portion, an angle bracket secured in juxtaposed relationship to said web portion, a hollow handle member secured to the said angle bracket, electrical wire means passing thru the said hollow handle means connecting the said electrical heating members to a source of electrical current supply by virtue of said binding post means, and leg means secured to the said griddle means, the said leg means provided with three hemispherical contact portions contacting the said griddle means.

THEOFANIS VOUVALIDIS.